US007904697B2

(12) United States Patent
Barrick et al.

(10) Patent No.: US 7,904,697 B2
(45) Date of Patent: Mar. 8, 2011

(54) LOAD REGISTER INSTRUCTION SHORT CIRCUITING METHOD

(75) Inventors: Brian David Barrick, Pflugerville, TX (US); Brian William Curran, Saugerties, NY (US); Lee Evan Eisen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/044,013

(22) Filed: Mar. 7, 2008

(65) Prior Publication Data

US 2009/0228692 A1    Sep. 10, 2009

(51) Int. Cl.
*G06F 7/38* (2006.01)
*G06F 9/00* (2006.01)
*G06F 9/44* (2006.01)

(52) U.S. Cl. ......................... 712/217; 711/113
(58) Field of Classification Search .................. 712/217; 711/133
See application file for complete search history.

(56) References Cited

U.S. PATENT DOCUMENTS

| 5,493,669 | A | * | 2/1996 | Denman, Jr. .................. 711/133 |
| 5,542,075 | A |   | 7/1996 | Ebcioglu et al. |
| 5,887,161 | A |   | 3/1999 | Cheong et al. |
| 6,189,088 | B1 |  | 2/2001 | Gschwind |
| 6,594,754 | B1 | * | 7/2003 | Jourdan et al. ................. 712/217 |
| 6,697,933 | B1 | * | 2/2004 | Pribush et al. ................ 712/217 |

* cited by examiner

*Primary Examiner* — Alford W Kindred
*Assistant Examiner* — Jesse R Moll
(74) *Attorney, Agent, or Firm* — Jon A. Gibbons; Fleit Gibbons Gutman Bongini & Bianco PL

(57) ABSTRACT

An apparatus and method for executing a Load Register instruction in which the source data of the Load Register instruction is retained in its original physical register while the architected target register is mapped to this same physical target register. In this state the two architected registers alias to one physical register. When the source register of the Load Address instruction is specified as the target address of a subsequent instruction, a free physical register is assigned to the Load Registers source register. And with this assignment the alias is thus broken. Similarly when the target register of the Load Address instruction is the target address of a subsequent instruction, a new physical register is assigned to the Load Registers target address. And with this assignment the alias is thus broken.

17 Claims, 6 Drawing Sheets

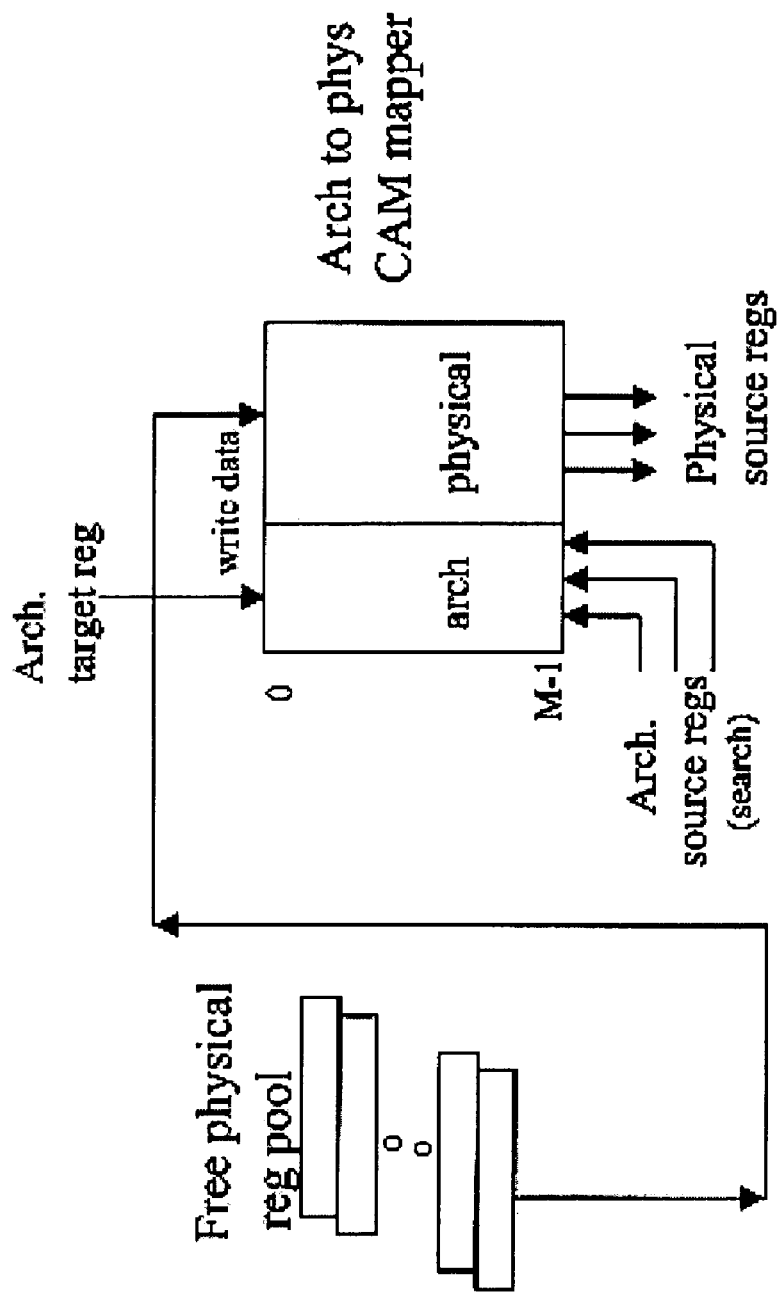
Figure 1. State-of-art Mapper

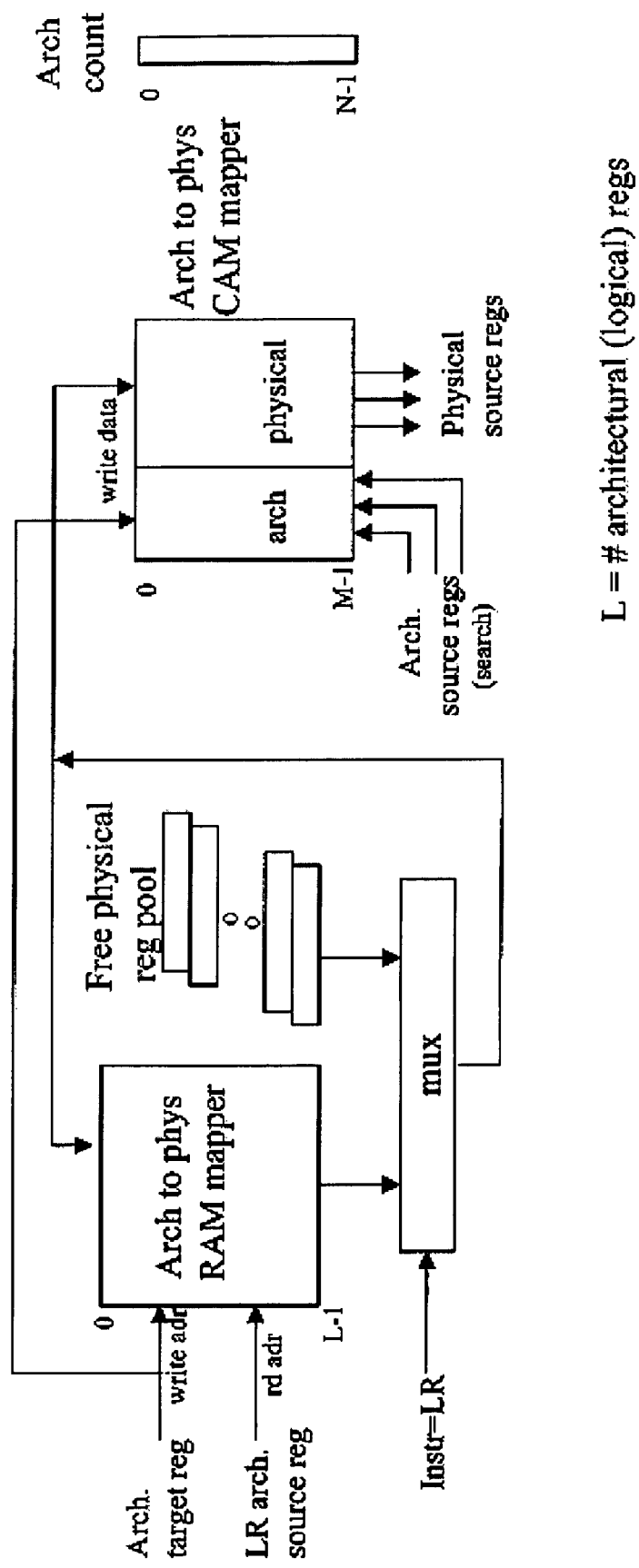
Figure 2. Disclosed Mapper

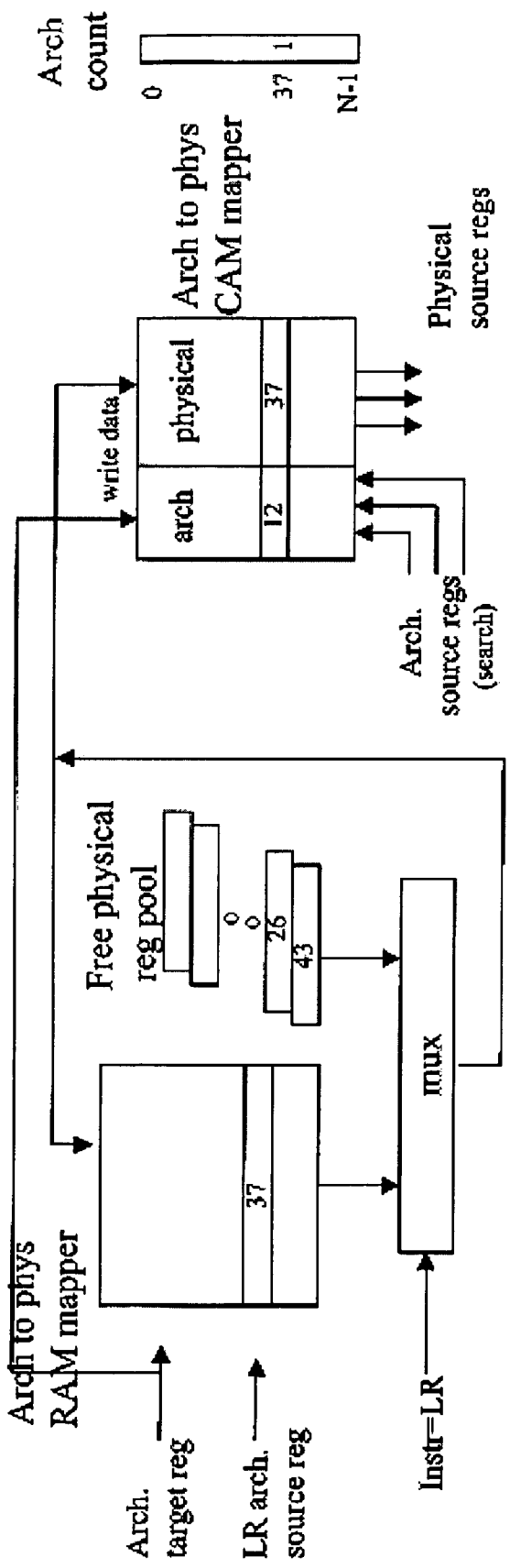
Figure 3a. LR shortcircuiting example

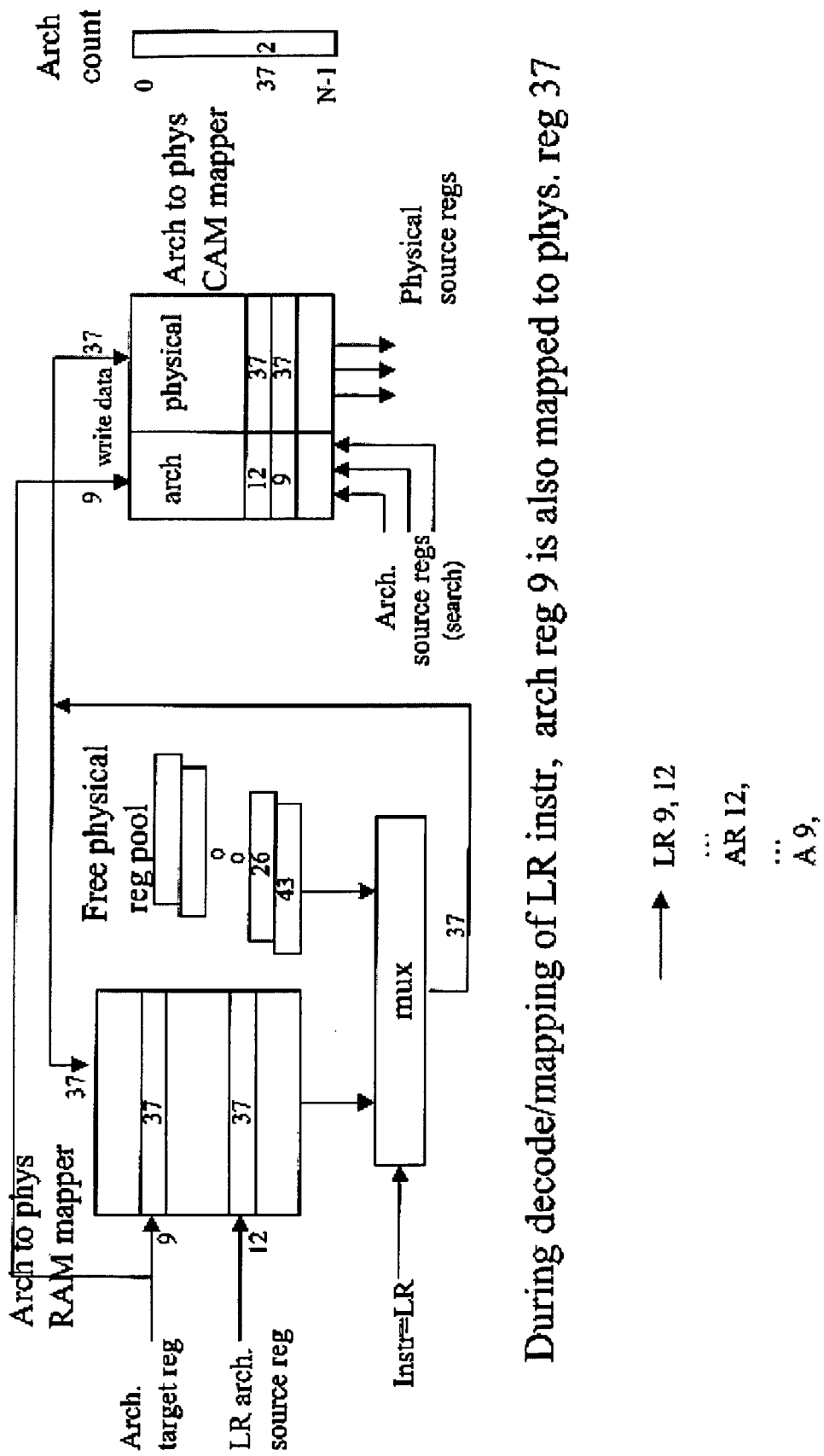
Figure 3b. LR shortcircuiting example

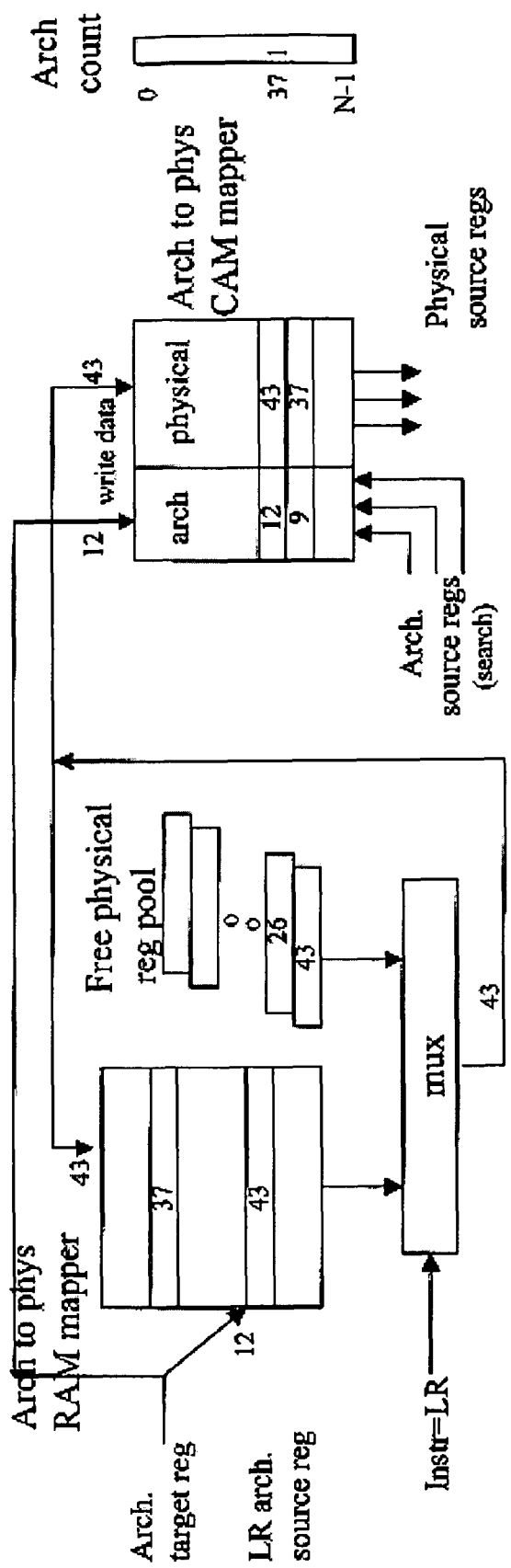
Figure 3c. LR shortcircuiting example

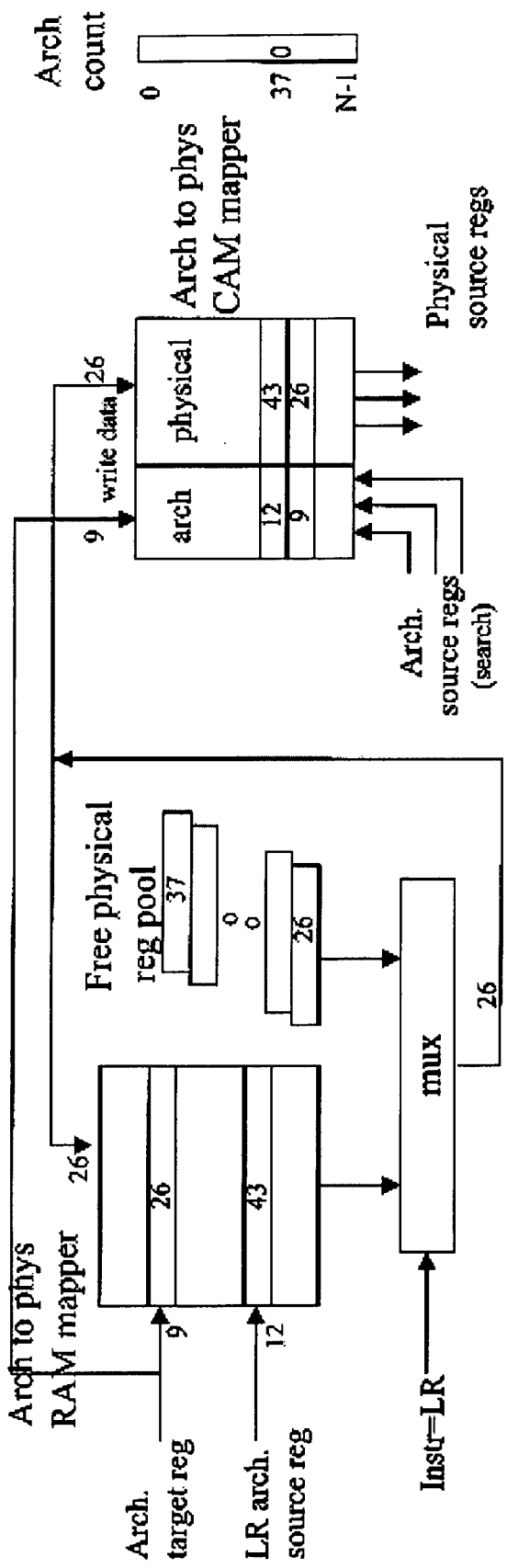
Figure 3d. LR shortcircuiting example

LOAD REGISTER INSTRUCTION SHORT CIRCUITING METHOD

FIELD OF THE INVENTION

This invention relates to an improved apparatus and method to for executing a computer program instruction which copies the contents of registers, and more to a method and apparatus that improves overall microprocessor performance.

BACKGROUND OF THE INVENTION

As will be appreciated by those skilled in the art, a instruction which copies the contents of a register to another register is used to preserve data that may be altered in response to one instruction but may be needed by a subsequent instruction. For example, a program includes a first instruction that uses the same register for both the data source and data target. For example, an instruction to add the content of register R1 to the content of register R2 and store the result in register R1. If a subsequently executing instruction requires the original contents of register R1 prior to the add instruction then a copy register instruction must be inserted into the program prior to the add instruction to copy the original contents of register R1 to another register R3. In S/390 the Load Register (LR) instruction provides this copy capability.

FIG. 1 is a block diagram of a prior art apparatus and method in an out of order microprocessor for assigning a register to store the original content of R1 so it is available as a data source for a subsequently executed instruction. For example, the instruction LR 7, 12 copies the contents of logical register 12 into logical register 7. As illustrated in FIG. 1, an architected to physical register mapper receives as inputs the architected target register and the architected source register. A physical register from the free register pool is assigned to hold the copied data.

It will be appreciated that the LR instruction merely preserves data for possible future use and in this sense does not perform useful computation. In addition, the execution of an LR instruction uses hardware resources: a physical registers, an issue queue entry, and a fixed-point unit execution cycle. Further, instructions using the data saved by the LR instruction cannot execute until the data is physically stored in the assigned physical target register.

SUMMARY OF THE INVENTION

An object of this invention is the provision of an improved method and apparatus for executing LR instructions. A method and apparatus that requires fewer physical registers, few issue queue entries, and fewer fixed point unit execution cycles.

A further object of the invention is to permit earlier execution of younger instructions dependent on the LR instruction.

Briefly, this invention contemplates the provision of an apparatus and method for executing a Load Register instruction in which the source data of the Load Register instruction, which is to be preserved in an unaltered state, is retained in the original physical register while the architected target register is mapped to same physical target register. In this state, both the architected source register and architected target register map to the same physical register. In this state, two architected registers alias to one physical register.

When the source register of the Load Address instruction is specified as the target address of a subsequent instruction, a free physical register is assigned to the Load Registers source register. And with this assignment the alias is thus broken. Similarly when the target register of the Load Address instruction is the target address of a subsequent instruction, a new physical register is assigned to the Load Registers target address. And with this assignment the alias is thus broken.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a block diagram of a prior art system for mapping architected registers to physical registers.

FIG. 2 is a block diagram of a system for mapping architected registers to physical registers in accordance with the teachings of this invention.

FIGS. 3a, 3b, 3c, and 3d respectively illustrate the operation of the mapper shown in FIG. 2.

FIG. 3a shows the initial mapping prior to decoding of the LR instruction.

FIG. 3b shows the mapper state with architected source register and architected target register aliased after the decoding of the LR instruction in accordance with the teachings of this invention.

FIG. 3c shows the mapper state after the decoding of a subsequent instruction which breaks the alias by re-assigning the LR target register to a new physical register.

FIG. 3d shows the mapper state after the decoding of a subsequent instruction which re-assigns the LR source register to a new physical register.

DETAILED DESCRIPTION OF THE INVENTION

Referring now to FIG. 2 of the drawings, in addition to the prior art architected register to physical register CAM (content addressable memory) mapper used to map a free physical register from the register pool to the target register of a Load Register instruction, the system of this invention adds as functional components, an Architected address to physical address RAM (random access memory) mapper, a multiplexer "mux", and a counter "Arch count" that keeps count of the number of architected registers mapped to each physical register.

In the illustrative example of FIG. 3, architected register 12 has been assigned to physical register 37 by the CAM mapper as in the prior art. This assignment of physical register 37 to architected register 12 is also stored in the RAM mapper, as shown FIG. 3a. The Arch count array entry 37 is initialized to one to indicate that one architected register is mapped to physical register 37. When Load Register instruction LR 9, 12 is decoded, 37 (the current mapping of the source register 12) is copied as illustrated in FIG. 3b. The current physical register mapping of the source register is read from the RAM mapper, selected via the mux and broadcast to the write port of both RAM and CAM mappers. RAM entry 9 is written with this physical register 37 and a new CAM entry is created to map target register 9 to physical register 37. Note the physical register from the RAM is selected for LR instructions; for all other instructions a physical register from the free physical register pool is selected. The Arch count array entry 37 is incremented to two, indicating two architected registers now point to physical register 37. Here it should be noted that no movement of data from one physical register to another is required. Subsequent instructions which source architected register 9 will automatically obtain the contains of architected register 12 since both 9 and 12 map to the same physical register. Thus the execution of the LR instruction is unnecessary. No issue queue entry or fixed point execution cycle is needed.

FIG. 3c illustrates the operation of the invention when subsequently the architected source register (12) of the Load Register instruction is the architected target register of a subsequent instruction. Here the alias is broken. When the subsequent instruction is decoded the mux selects register 43 from the free physical register pool which is broadcast to both the RAM and CAM mappers. The RAM entry 12 is written with 43 and a new CAM entry is created which maps target register 12 to physical register 43. The Arch count array entry 37 is decremented to one since only one architected register remains mapped to physical register 37. (In addition, the Arch count array entry 43 is set to one to indicate that one architected register is currently mapped to physical register 43.)

Similarly FIG. 3d illustrates the operation of the invention when subsequently the architected target register (9) of the Load Register instruction is the architected target register of a subsequent instruction. When the subsequent instruction is decoded the mux selects register 26 from the free physical register pool which is broadcast to both the RAM and CAM mappers. The RAM entry 9 is written with 26 and a new CAM entry is created which maps target register 9 to physical register 26. The Arch count array entry 37 is decremented to zero since no architected registers remain mapped to physical register 37. Physical register 37 is now written to the top of the free physical register pool. (In addition, the Arch count array entry 26 is set to one to indicate that one architected register is currently mapped to physical register 26.)

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow.

The invention claimed is:

1. A method for executing a series of instructions in an out-of-order execution processor including an instruction which copies data from a first architected register to a second architected register, and a mapper which maps architected registers to physical registers, comprising:

identifying a current physical register that is mapped to the first architected register from a first mapper;

broadcasting a mapping identifying that the current physical register is mapped to the first architected register to a write port of the first mapper and a second mapper;

writing, in response to the broadcasting, an entry associated with the second architected register in the first mapper that identifies the current physical register; and writing a new entry in the second mapper that maps the second architected register to the current physical register.

2. The method according to claim 1, further comprising:

counting a number of architected registers mapped to a same physical register;

and returning the same physical register to a free register pool when the number is zero.

3. The method according to claim 1, further comprising:

mapping the second architected register to a new physical register in response to an executing instruction that designates the second architected register a target register.

4. The method according to claim 3, wherein the new physical register is selected from a pool of free registers.

5. The method according to claim 3, further comprising:

counting a number of architected registers mapped to a same physical register; and returning the same physical register to a free register pool when the counting step is zero.

6. The method according to claim 5, wherein the new physical register is selected from a pool of free registers.

7. A system for executing a series of instructions in a processor including an instruction to fetch data from a first architected register address pointing to a first physical register address, modify the data, modify the data and store the modified data back at the first architected register address, and a load register instruction to save the data at the first architected register address at a second architected register address, the system comprising:

a first mapper that maps the first architected register address to the first physical register address;

a second mapper that maps the first architected register address to the first physical register address and comprises an architected source register address input and an architected target register address input for a load register instruction;

a multiplexer coupled to an output of the second mapper, and in response to a load register instruction specifying the first architected register address as a source register address, the multiplexer coupling the first physical register address from the second mapper to the first mapper so that the architected target register address of the load register instruction points into the first mapper to the first physical register address.

8. The system according to claim 7, further comprising:

a counter for counting a number of architected register addresses that point to a same physical address register.

9. The system according to claim 7, further comprising:

a free register pool from which a physical register address is selected and mapped to the first architected register address of the load register instruction in response to an instruction that has the first architected register address of the load register instruction as a target register address.

10. The system according to claim 8, wherein the same physical address register is returned to a free register pool when a count in the counter is zero.

11. The system according to claim 8, further comprising:

a free register pool from which a physical register address is selected and mapped to the first architected register address of the load register instruction in response to an instruction that has the first architected register address of the load register instruction as a target register address.

12. The system according to claim 11, wherein said same physical address register is returned to said free register pool when a count in said counter is zero.

13. A system for executing a series of instructions in a processor including an instruction to fetch data from a first architected register address pointing to a first physical register address, modify the data, modify the data and store the modified data back at the first architected register address, and a load register instruction to save the data at the first architected register address at a second architected register address, the system comprising:
   a first mapper configured to map the first architected register address to the first physical register address in the first mapper; and
   a second mapper configured to map the first architected register address to said first physical register address in the second mapper;
   wherein responsive to a load register instruction specifying the first architected register address as a source register address, the first physical register address from the second mapper is coupled to the first mapper so that the architected target register address of the load register instruction points into the first mapper to the first physical address.

14. The system according to claim 13, further comprising:
   a counter configured to count a number of architected register addresses that point to a same physical address register.

15. The system according to claim 13, further comprising:
   a free register pool from which a physical register address is selected and mapped to the first architected register address of the load register instruction in response to an instruction that has the first architected register address of the load register instruction as a target register address.

16. The system according to claim 15, further comprising:
   a counter configured to count a number of architected register addresses that point to a same physical address register.

17. The system according to claim 16, wherein said same physical address register is returned to said free register pool when a count in said counter is zero.

* * * * *